United States Patent [19]

Weisman

[11] 4,317,509
[45] Mar. 2, 1982

[54] TRANSMISSION SAFETY DEVICE

[76] Inventor: Alan Weisman, 570 Spring St., Richmond, Calif. 94804

[21] Appl. No.: 168,766

[22] Filed: Jul. 11, 1980

[51] Int. Cl.³ .............................................. B60K 41/26
[52] U.S. Cl. ................................... 192/4 A; 192/4 C; 74/97
[58] Field of Search ....................... 192/4 C, 4 A, 4 R; 74/97, 100 R, 473

[56] References Cited

U.S. PATENT DOCUMENTS 3,316,776  5/1967  Schroter ............................ 74/97 X
3,844,183  10/1974  Wilke .............................. 192/4 A X

FOREIGN PATENT DOCUMENTS 325263  2/1930  United Kingdom .................. 74/473

Primary Examiner—George H. Krizmanich

[57] ABSTRACT

The transmission lever which effects a change of gears inside the transmission is held in "park" position against any tendency for it to accidentally shift to "reverse" position. The lever is held in the "park" position by a spring whose line of action shifts in response to deliberate movement of the transmission lever by its associated manually operated linkage so as not to impede normal movement of the lever in its other positions.

3 Claims, 3 Drawing Figures

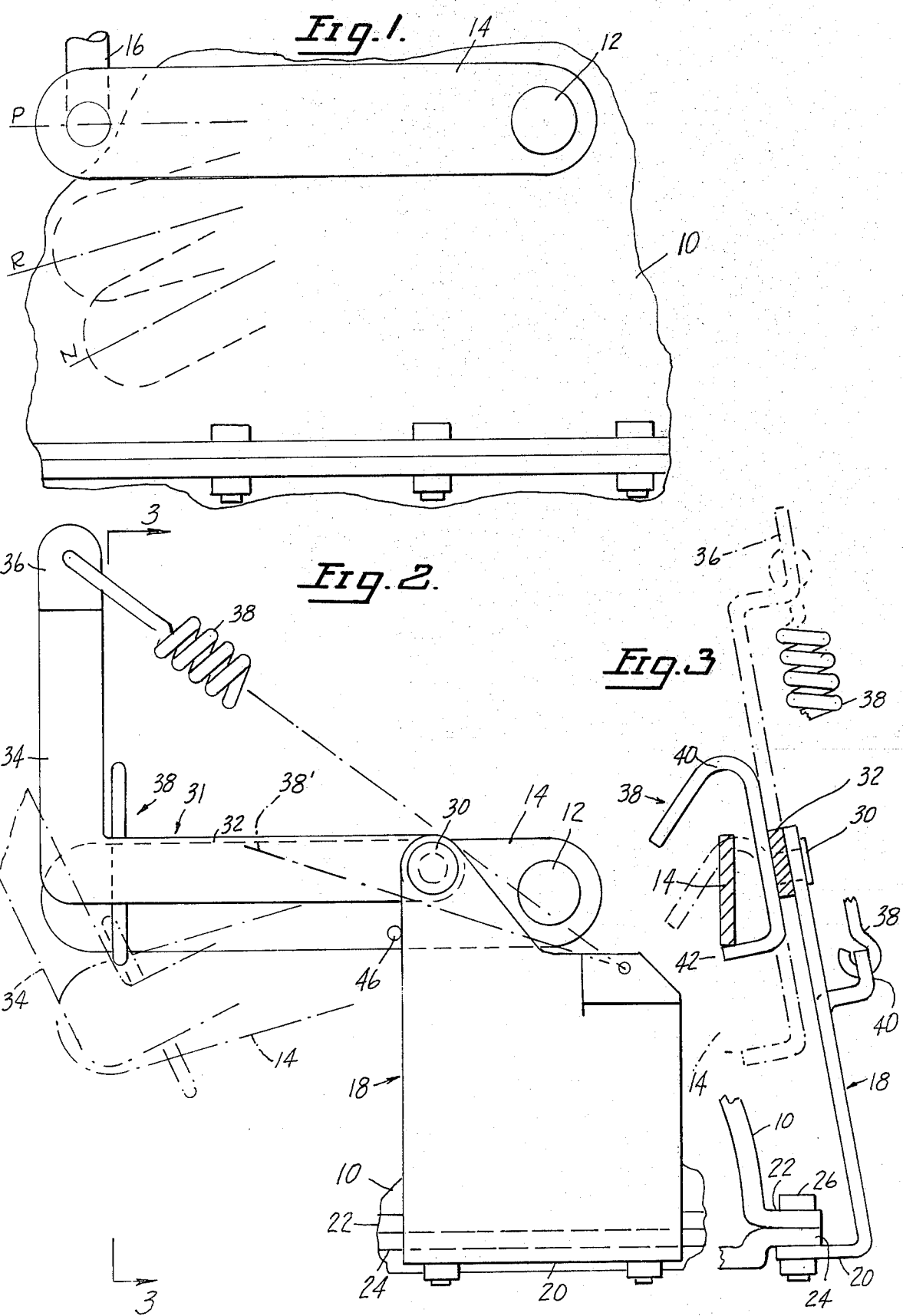

TRANSMISSION SAFETY DEVICE

This invention relates to a holding device for holding the manually operated transmission lever of a transmission in its "park" position against any tendency for said lever to accidentally shift into "reverse" position.

In recent years numerous accidents have been caused by automobile drivers leaving a vehicle in "park" with the engine running when the transmission shift lever, due to vibration or for other reasons, accidentally shifts out of its "park" position by its "reverse" position. The tendency for some automobiles to fail in this manner is not always due to faulty original design since the condition creating the hazards can come about due to normal wear in the linkage elements, bushings, bearings, grommets and other parts of the mechanism.

The main object of the present invention is the provision of a holding device for holding the shift lever of a transmission in "park" position against any tendency for it to accidentally shift into "reverse" position.

Another object of the invention is the provision of a device for holding the shift lever in "park" position and which device does not interfere in any way with normal shifting into the various other transmission lever positions.

Other objects and advantages will be apparent from the following specification and from the drawings.

FIG. 1 is a side elevation of a portion of a typical transmission housing showing the shift lever and indicating some of the positions it can take.

FIG. 2 is a view similar to FIG. 1 but with the device of the present invention applied thereto.

FIG. 3 is a section taken in a plane indicated by lines 3—3 of FIG. 2.

In detail, in FIG. 1 a portion of a housing 10 of a transmission assembly is shown including the end of the shaft 12 which, when oscillated, effects a change in gear combinations inside the transmission housing in a manner well known in the art.

Secured to shaft 12 is one end of a shift lever 14 which is normally actuated by a linkage terminating at the steering column or console of the vehicle and actuatable manually by the operator. In FIG. 1 the adjacent end of such linkage is indicated at 16. The full line position of shift lever 14 in FIG. 1 is the "park"0 position and indicated at P. Movement of the end 16 of the shifting linkage permits shifting lever 14 to "reverse" position indicated at R, "neutral" position indicated at N, "drive" position indicated at D and additional drive positions not indicated in FIG. 1.

The present invention comprises a support generally designated 18 which may be formed from flat plate and provided with a horizontally extending bottom flange 20 which may conveniently be secured to the transmission housing flanges 22, 24 by bolts 26 which normally are employed to secure together the drain pan and the transmission housing 10. In different models different mounting means are available.

As best seen in FIG. 3 the upper main portion of support plate 18 is inclined to the plane in which the shift lever 14 moves for a reason that will be pointed out later. Pivotally secured to the upper portion of support plate 18 by pivot pin 30 is an L-shaped lever 31 having a horizontally extending leg 32 and a vertically extending leg 34.

The upper end of leg 34 is offset as at 36 and is apertured to receive one end of an elongated helical tension spring 38 which is connected at its opposite end to an offset portion 40 of support plate 18.

Adjacent the vertical leg 34 of lever 31 is a bent rod 38 (FIG. 3) which is fixedly secured as by welding to horizontal leg 32 of lever 31 and which is formed to provide an upper abutment 40 and a lower abutment 42. As best seen in FIG. 3 said abutments 41, 42 are formed so as to receive shift lever 14 therebetween when the latter is in the full line position of FIGS. 1, 2.

It will be noted that the above described assembly results in the lower abutment 42 urging the shift lever 14 upwardly under the urgency of spring 38 so that there is no tendency for the shift lever 14 to accidentally move toward the "reverse" position.

When the operator desires to move the transmission out of "park" position the deliberate movement of the shifting linkage by the operator with the normal amount of force towards "reverse" position causes lever 31 to move to the dot dash line position of FIG. 2 and causes the line of action of spring 38 to swing to the position indicated schematically at 38' in FIG. 2. In such position it will be noted that the line of action of spring 38 is on the opposite side of pivot 30 relative to its line of action in the "park" position thereby urging the lever 31 downwardly or in a counter clockwise direction.

In order to prevent further counter clockwise movement of lever 31 much beyond its position shown in FIG. 2, a stop 46 is secured to support plate 18 so as to abut the lower edge of horizontal leg 32 of lever 31.

Referring now to FIG. 3 it will be seen that, due to the inclination of the plane in which lever 31 moves, the lower abutment 42 is disengaged from shift lever 14 so that the latter is free to be shifted to the various other positions of the transmission.

However, upon upward movement of the shift lever 14 toward "park" position the lever engages the upper abutment 40 and carries the L-shaped lever 31 upwardly to the full line position of FIG. 2 in which position the spring 38, after it passes dead center position, insures that the shift lever does not move out of "park" position accidentally.

It will be noted that spring 38 has the added advantage of actually pulling the transmission lever into "park" position even when the operator mistakenly neglects to complete the proper shifting movement.

I claim:

1. In a transmission having a transmission lever adapted to be manually shifted to various positions including "park", "reverse", "neutral" and "drive", means for providing an additional holding force for holding said lever in "park" comprising:
   a member pivotally supported relative to said transmission and formed to provide a pair of spaced apart abutments,
   one of said abutments adapted to be engaged by said lever as said lever is moved in one direction from "reverse" position to "park" position for swinging said member about its pivot from a first position to a second position,
   spring means fixedly secured at one end relative to said transmission and connected at its other end to said member,
   the line of action of said spring means moving from one side of the pivot of said member to the opposite side of the pivot upon movement of said member between said first and second positions,
   the other of said abutments being positioned to engage said lever for urging it in said one direction under the urgency of said spring means when said member is in said second position.

2. Apparatus of claim 1 wherein said member moves through a path of travel angularly disposed relative to the path of travel of said lever whereby said other abutment is disengaged from said lever upon movement of the latter from "park" position toward "neutral" position.

3. Apparatus of claim 2 wherein said one abutment is of sufficient size to be engaged by said lever upon movement of the latter toward "park" position and said other abutment being of a size to be free from engagement by said lever as the latter moves from "park" position toward neutral position.

* * * * *